(12) United States Patent
Breuer

(10) Patent No.: US 10,316,487 B2
(45) Date of Patent: Jun. 11, 2019

(54) SMALL LOADER

(71) Applicant: Clark Equipment Company, West Fargo, ND (US)

(72) Inventor: Jim M. Breuer, Mandan, ND (US)

(73) Assignee: Clark Equipment Company, West Fargo, ND (US)

( * ) Notice: Subject to any disclaimer, the term of this patent is extended or adjusted under 35 U.S.C. 154(b) by 0 days.

(21) Appl. No.: 15/424,401

(22) Filed: Feb. 3, 2017

(65) Prior Publication Data
US 2017/0226716 A1   Aug. 10, 2017

Related U.S. Application Data

(60) Provisional application No. 62/291,844, filed on Feb. 5, 2016.

(51) Int. Cl.
| | |
|---|---|
| *E02F 3/34* | (2006.01) |
| *E02F 9/16* | (2006.01) |
| *E02F 9/20* | (2006.01) |

(52) U.S. Cl.
CPC ............... *E02F 3/34* (2013.01); *E02F 9/166* (2013.01); *E02F 9/2004* (2013.01)

(58) Field of Classification Search
CPC ..................................... E02F 9/16; B60R 3/02
See application file for complete search history.

(56) References Cited

U.S. PATENT DOCUMENTS

| | | |
|---|---|---|
| 1,356,744 A | 10/1920 | Schmidt |
| 1,479,348 A | 1/1924 | Wickersham |
| 1,741,878 A | 12/1929 | Rasmussen |
| 1,964,779 A | 7/1934 | Ziegler |
| D116,319 S | 8/1939 | Heaslet |
| 2,452,671 A | 11/1948 | Merrill |
| 2,483,473 A | 10/1949 | Passelegue |
| 2,845,192 A | 7/1958 | Klaus |
| 3,239,021 A | 3/1966 | Harvey |
| D205,485 S | 8/1966 | Juhl et al. |
| 3,963,131 A | 6/1976 | Dimmer |
| 5,328,321 A * | 7/1994 | Moffett .................. B60K 17/10 187/226 |
| 5,388,850 A | 2/1995 | Simone |
| D398,014 S | 9/1998 | Wolf |
| 6,205,753 B1 | 3/2001 | Velke et al. |
| 6,997,667 B2 | 2/2006 | Hackett et al. |

(Continued)

FOREIGN PATENT DOCUMENTS

| | | | | |
|---|---|---|---|---|
| GB | 883953 A | | 12/1961 | |
| JP | 03069731 | * | 3/1991 | ............... E02F 9/16 |
| JP | H0369731 A | | 3/1991 | |

OTHER PUBLICATIONS

International Search Report and Written Opinion dated May 8, 2017 for International Application No. PCT/US2017/016523 filed Feb. 3, 2017, 13 pages.

*Primary Examiner* — Ronald P Jarrett
(74) *Attorney, Agent, or Firm* — John D. Veldhuis-Kroeze; Westman, Champlin & Koehler, P.A.

(57) ABSTRACT

Disclosed are power machines with an operator seat proximal to the rear or back of the power machine, hand grip operator supports which can have user input devices positioned thereon, and foot supports configured to comfortably allow an operator to operate the power machine from both seated and standing positions.

15 Claims, 4 Drawing Sheets

(56) References Cited

U.S. PATENT DOCUMENTS

| | | |
|---|---|---|
| 7,131,507 B2 | 11/2006 | Wenger et al. |
| D555,673 S | 11/2007 | Hendron et al. |
| 7,641,285 B2 | 1/2010 | Jacobs |
| D614,204 S | 4/2010 | Thompson et al. |
| 7,942,224 B2 | 5/2011 | Marshall et al. |
| 8,844,665 B2 * | 9/2014 | Wenger ............ B62D 5/063 180/193 |
| 2005/0262958 A1 * | 12/2005 | Kojima ............ B63H 20/10 74/484 R |
| 2008/0197588 A1 | 8/2008 | Azure et al. |
| 2011/0016755 A1 | 1/2011 | Hill |

* cited by examiner

SMALL LOADER

CROSS-REFERENCE TO RELATED APPLICATION

The present application is based on and claims the benefit of U.S. provisional patent application Ser. No. 62/291,844, filed Feb. 5, 2016, the content of which is hereby incorporated by reference in its entirety.

BACKGROUND

The present disclosure is directed toward power machines. More particularly, the present disclosure is related to operator stations of small loaders or mini-loaders.

Small loaders, sometimes referred to as mini-loaders, are generally similar to larger sized loaders in that they include a moveable lift arm mounted to a frame that is capable of carry and can have implements, such as a tiltable bucket, mounted on the loader. However, instead of having an operator station including a cab mounted on top of its frame, mini-loaders typically have an operator station located at the rear of the machine such that an operator can operate the loader while either walking behind the loader or standing on a platform mounted on the rear of the loader. Improving operator comfort and visibility, while operating the loader would be beneficial.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter.

The present disclosure includes mini-loaders with an operator seat accessible from the rear of the power machine, hand grip operator supports which can have user input devices positioned thereon, and foot supports configured to comfortably allow an operator to operate the power machine from both seated and standing positions.

In one embodiment, a mini-loader power machine is disclosed. The mini-loader power machine has a frame, first and second tractive elements operably coupled to sides of the frame, a power source mounted to the frame, and a control system operably coupled to the power source and configured to selectively apply power from the power source to work functions of the power machine. An operator station is positioned at a rear of the frame. The operator station includes a seat coupled to the rear of the frame and is configured to allow access by an operator from both rearward of the seat and from sides of the seat. At least one user input device is configured to communicate with the control system to control the work functions of the power machine. First and second foot supports are located toward the rear of the frame adjacent the sides of the seat. A hand grip operator support is operably coupled to the frame and configured to be held onto by the operator while seated on the seat and operating the power machine.

In another embodiment, a power machine having a frame, a work element operably coupled to the frame and configured to perform a work function, first and second tractive elements operably coupled to sides of the frame, and a power source mounted to the frame is disclosed. The power machine has a control system operably coupled to the power source and configured to selectively apply power from the power source to the work element to perform the work function. An operator station is positioned at a rear of the frame. The operator station includes at least one user input device configured to communicate with the control system to control the work function, first and second foot supports located toward the rear of the frame adjacent to the sides of the seat, and a handle bar having first and second grips operably coupled to the frame and configured to be held onto by the operator, one of the handle bar and at least one hand grip being manipulable to control the work element.

DETAILED DESCRIPTION

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

The present disclosure includes mini-loader type power machines with an operator seat proximal to the rear of the power machine, hand grip operator supports which can have user input devices positioned thereon or proximal thereto, and foot supports configured to comfortably allow an operator to operate the power machine from both seated and standing positions.

Figure 4:
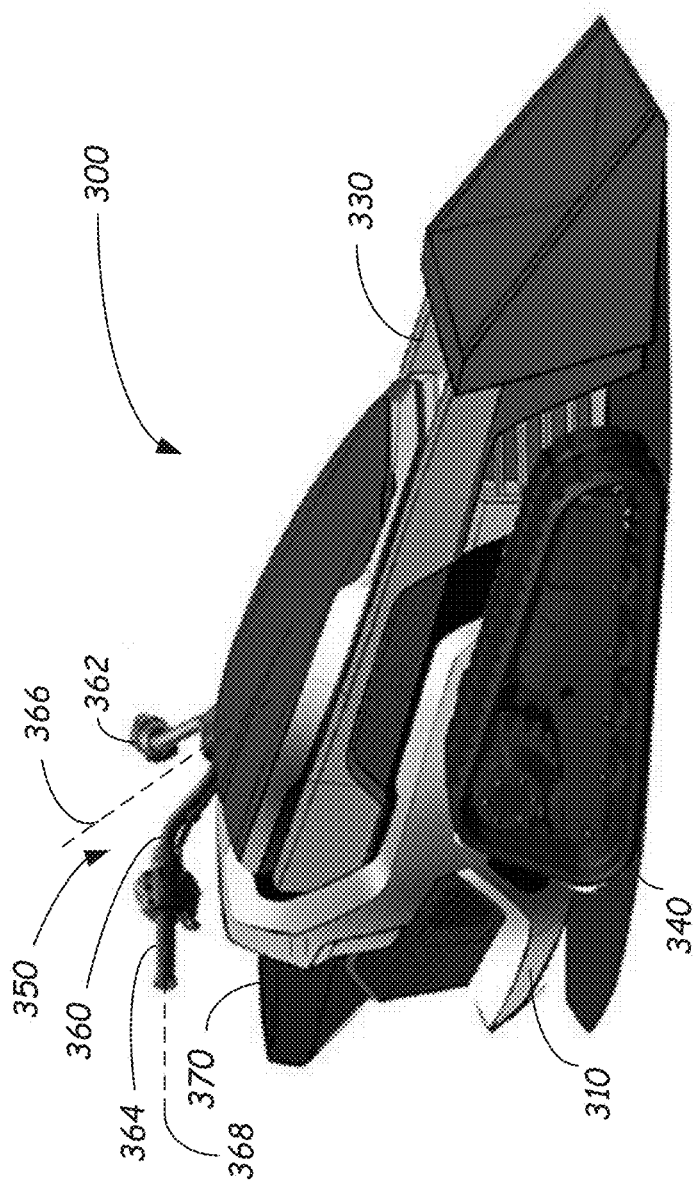
FIG. 4 is a perspective view of a power machine according to one illustrative embodiment.

These concepts can be practiced on various power machines, as will be described below. A representative power machine on which the embodiments can be practiced is illustrated in diagram form in FIG. 1 and examples of such a power machine are illustrated in FIGS. 2 and 4. Power machines, for the purposes of this discussion, include a frame, at least one work element, and a power source that is capable of providing power to the work element to accomplish a work task. One type of power machine is a mini-loader.

Figure 1:
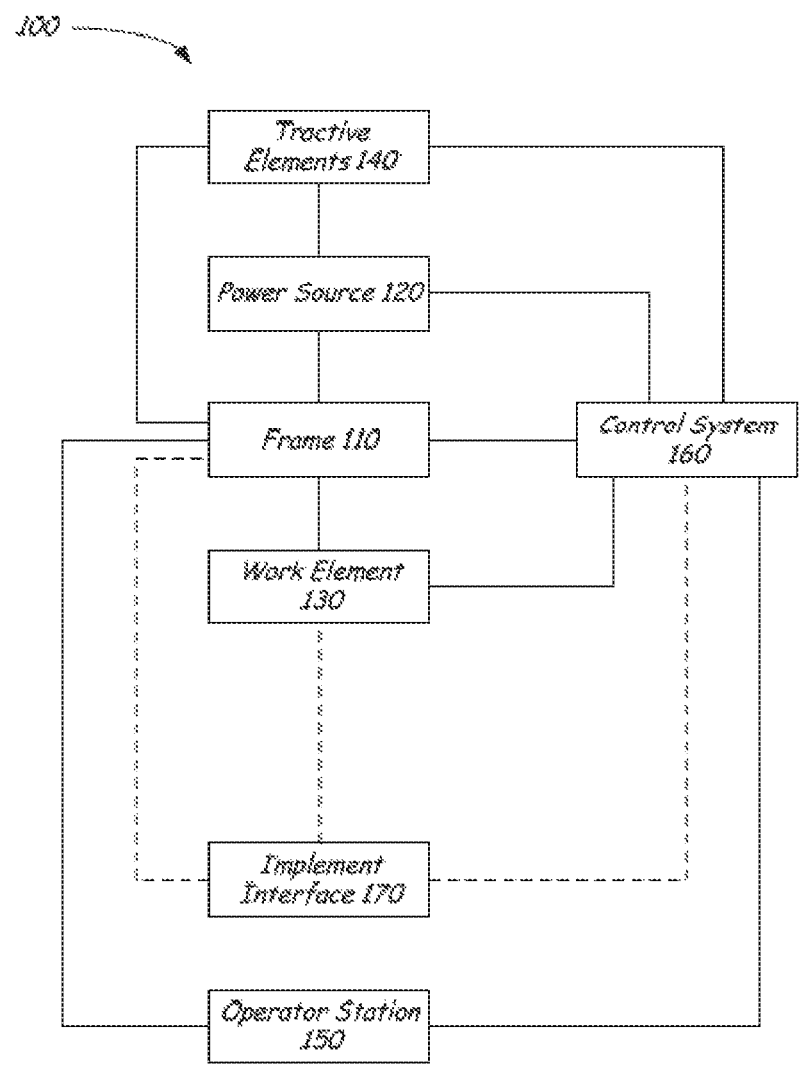
FIG. 1 is a block diagram illustrating functional systems of a representative power machine on which embodiments of the present disclosure can be advantageously practiced.
Figure 2:
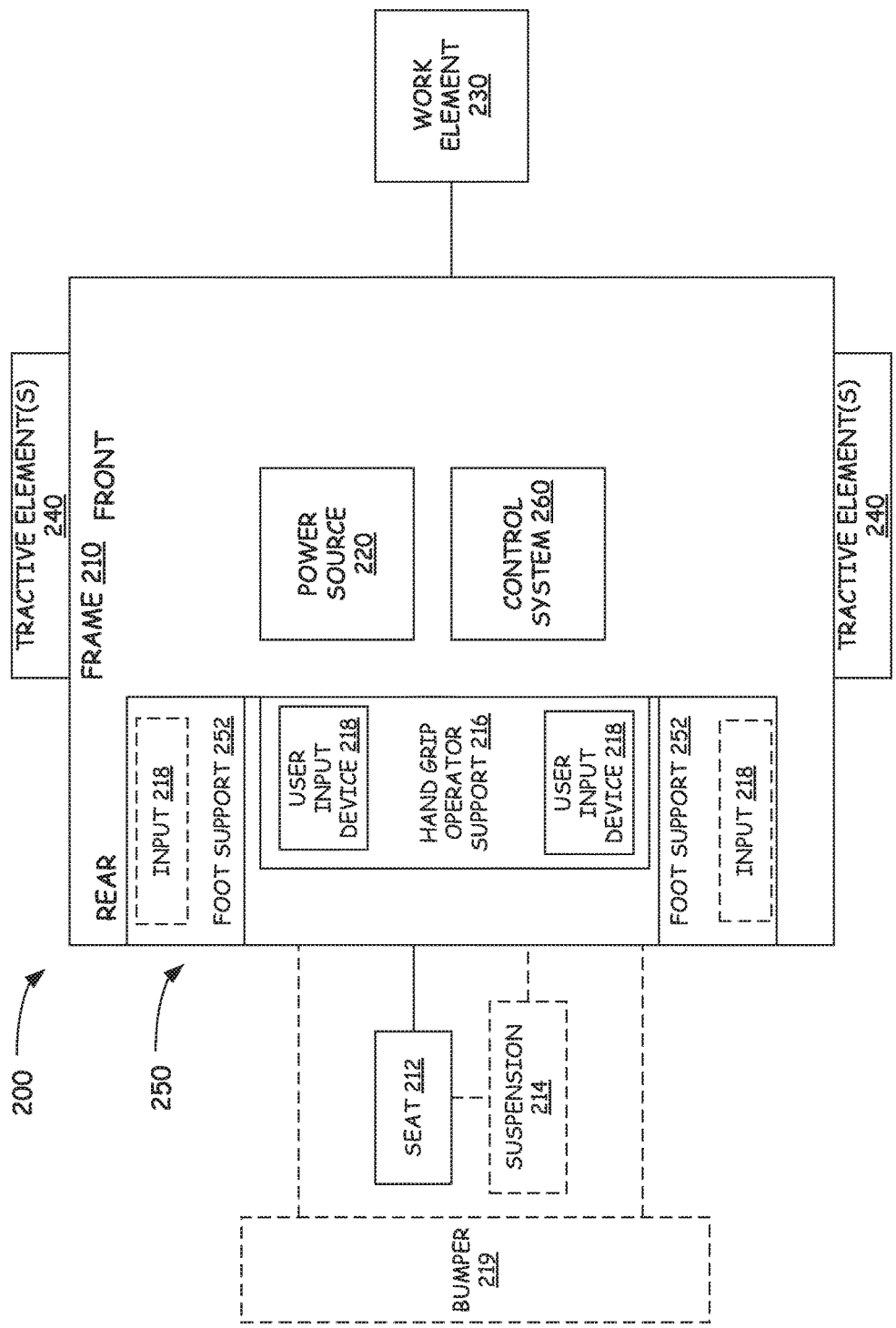
FIG. 2 is a block diagram illustrating a seat, hand grip operator supports, and foot supports of an exemplary embodiment of the power machine represented in FIG. 1.

FIG. 1 illustrates a block diagram including the basic systems of a small loader type of power machine 100 upon which the embodiments discussed below can be advantageously incorporated. The block diagram of FIG. 1 identifies various systems on power machine 100 and the relationship between various components and systems. The power machine 100 has a frame 110, a power source 120, and a work element 130. Because power machine 100 shown in FIG. 1 is a self-propelled power machine, it also has tractive elements 140, which are themselves work elements provided to move the power machine over a support surface and an operator station 150 that provides an operating position for controlling the work elements of the power machine. In exemplary embodiments described below in greater detail, operator station 150 includes a seat which is accessible from the rear or back of the power machine. A control system 160 is provided to interact with the other systems to perform various work tasks at least in part in response to control signals provided by an operator.

Certain power machines have work elements that are capable of performing a dedicated task. For example, some power machines have a lift arm to which an implement, such as a bucket, is attached such as by a pinning arrangement. The work element, i.e., the lift arm can be manipulated to position the implement for the purpose of performing the task. The implement, in some instances can be positioned relative to the work element, such as by rotating a bucket relative to a lift arm, to further position the implement. Under normal operation of such a power machine, the bucket is intended to be attached and under use. Such power machines may be able to accept other implements by disassembling the implement/work element combination and reassembling another implement in place of the original bucket. Other power machines, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work elements with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that is capable of moving with respect to another portion of the frame.

Frame 110 supports the power source 120, which is capable of providing power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is capable of converting the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. Like conventional small walk-behind or stand-on loaders, operator station 150 provides an operating position from which the power machine is properly operated. Further, some power machines such as power machine 100 and others may be capable of being operated remotely (i.e. from a remotely located operator station) instead of or in addition to an operator station adjacent or on the power machine. This can include applications where at least some of the operator controlled functions of the power machine can be operated from an operating position associated with an implement that is coupled to the power machine. Alternatively, with some power machines, a remote control device can be provided (i.e. remote from both of the power machine and any implement to which is it coupled) that is capable of controlling at least some of the operator controlled functions on the power machine.

Referring now to FIG. 2, shown is a block diagram of portions of a power machine 200 in accordance with exemplary embodiments. Power machine 200 is of the type generally discussed above with respect to FIG. 1 and generally similar features are similarly numbered. For example, power machine 200 has a frame 210 to which a power source 220 is mounted. Tractive elements 240 are operably coupled on either side of the frame 210 and a work element 230 is also coupled to the frame. In some embodiments (not shown in FIG. 2), the work element 230 has an implement interface for accepting and securing an implement thereto. In other embodiments, an implement interface can be directly mounted to the frame 210. As shown diagrammatically in FIG. 2, operator station 250 of power machine 200 is positioned at the rear of a frame 210 of the power machine and includes a seat 212 attached to the frame at the rear of the power machine. The seat 212 is accessible such that an operator can get on and off the seat from behind the seat or from the side of the seat. When seated on seat 212, the operator will, in some embodiments, straddle the seat and/or parts of the frame 210. Seats of conventional loaders are typically located within an operator enclosure (as discussed above) that is mounted on the frame closer to a center of the loader, but in small loader power machine 200 seat 212 is advantageously coupled to the frame positioned rearward of power source (e.g., the engine) 220. Further, in some exemplary embodiments, seat 212 is advantageously positioned rearward of tractive elements 240.

In some embodiments, seat 212 is mounted to the frame 210 via at least one suspension members 214, with the suspension member(s) being configured to absorb shock introduced into the power machine when the power machine 200 travels over an uneven support surface, when the power machine performs a work function with a work element 230, when the power machine abruptly stops, or however else shock may be introduced into the power machine. In some embodiments the suspension member(s) 214 are gas spring (s), in other embodiments, the suspension members are coil spring(s) or a combination of gas and coil springs. Other suspension schemes may be used without departing from the scope of these embodiments. Further, the suspension member(s) 214 can be adjustable in some embodiments. Further, in some embodiments, the seat 212 is adjustable to accommodate different sized operators and to improve or optimize viewing angles and visibility of work elements or attached implements, for example the cutting edge of a bucket implement. The seat 212 is advantageously positioned low enough so that the center of gravity of a typical operator is much lower when seated than when standing. In some illustrative embodiments, the seat can be moved from an operating position to a stowed position such as by pivoting the seat relative to the frame so that when the seat is in the stowed position, an operator can access the operator station while standing behind the machine. In some embodiments, the seat is pivotally mounted to the frame so that it can be folded up or down to be placed into the stowed position. Various linkages and pivoting mechanisms can be employed to move the seat between the operating and stowed positions.

Also shown in FIG. 2 is a hand grip operator support 216 configured to be held onto by the operator while operating the small loader power machine. In some exemplary embodiments, support member 216 is in the form of one or more handle bars with grips configured to be held onto by the left and right hands of the operator. While there may be more than one support member in various embodiments, for the purpose of clarity, going forward, the support member will be referred to in the singular in this disclosure. In some embodiments, the support member 216 is rigidly fixed on power machine 200, while in other embodiments support member 216 can be rotated or otherwise manipulated to control steering or other functions of the power machine.

At least some of user input devices 218 are, in exemplary embodiments, positioned on the handle bar or support member 216 such that the user input devices can be manipulated by an operator while holding onto the support members. Alternatively, the user input devices 218 can be positioned proximal to the support member 216, but not actually directly attached to the support member 216. User input devices 218 can include, for example, thumb or finger operated levers, joysticks, buttons, rotary switches or devices, or other types of user input devices.

Operator support member 216 and/or user input devices 218 positioned on the support member can be configured to control power machine and implement functions such the work element 230, which in some embodiments is a lift arm, additional work elements such as tilt actuator (not shown) that can be used, for example, to manipulate an implement that is operably coupled to a lift arm, and travel (using tractive elements 240). Any of a variety of desired control patterns of the user input devices 218 and/or support member 216 can be utilized to implement the various power machine functions. In the various control patterns, these functions are controlled by manipulation of the support member 216 and/or by manipulation of user input devices 218 incorporated on the support member or positioned elsewhere at the operator station 250. In some embodiments, a bumper 219 is attached to the frame and positioned slightly behind the seat to absorb impact with objects that the loader 200 may come into contact with inadvertently.

Operator station 250 also includes areas for the operator's feet and legs. Foot supports 252 on each side of the operator station 250 are to provide support for the operator's feet. For example, the foot supports 252 can include foot pegs or a relatively flat support surface. Padding (not shown) will be provided in some embodiments in areas on the frame 210 to provide comfort for the operator should the operator come into contact with the frame. In some embodiments, some or all of the user input devices 218 are included with foot supports 252 and are configured to communicate with control system 260 to control or implement power machine functions. For example, in some exemplary embodiments, a treadle pedal is provided for operation by an operator's foot, and power machine travel is controlled with the treadle pedal to control speed and direction, while steering is controlled by either the handle bar or operator support 216 being rotatable, or by user input devices 218.

Figure 3:
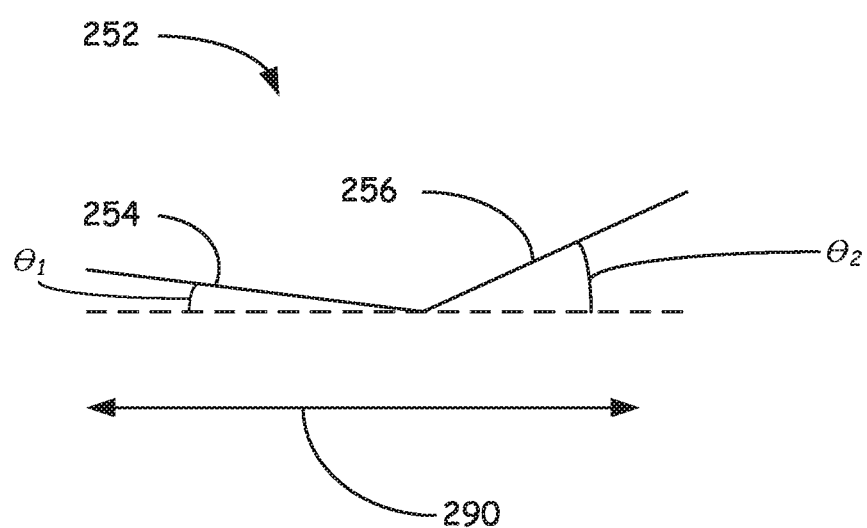
FIG. 3 is a diagrammatic illustration of features of foot supports in some exemplary embodiments.

Foot supports 252 can be flat and substantially parallel to the ground or support surface in some embodiments, or foot supports can be oriented at an angle relative to the support surface. In some embodiments, different portions or components of foot supports 252 are used to provide surfaces to comfortably support the operator's feet when seated and when standing to allow the operator to comfortably sit or stand while operating the power machine. For example, referring to FIG. 3, shown is an embodiment in which first and second portions 254 and 256 of foot supports 252 are in different planes relative to one another. In one exemplary embodiment, first portion 254 of foot supports 252 departs from horizontal or parallel at angle $\theta_1$. In some embodiments, angle $\theta_1$ can zero or substantially zero so that the first portion 254 is substantially parallel to the ground or support surface 290 so that the operator is oriented generally vertically when standing. In other embodiments, angle $\theta_1$ is greater than zero enough to cause the operator to be oriented slightly forward when standing. The second portion 256 of foot supports 252 is inclined at an angle $\theta_2$ relative to the support surface 290 to facilitate comfortable sitting operation.

FIG. 4 illustrates one embodiment of a mini-loader 300 of the current disclosure. Mini-loader 300 includes a frame 310, tractive elements 340 mounted to each side of the frame (only one is shown) and a work element 330 in the form of a lift arm that is operably coupled to the frame and moveable under power. A control system (not shown) is provided to selectively apply power to the lift arm 330 and the tractive elements, as well as other functions on the loader. A seat 370 is mounted toward the rear of the frame 310 so that an operator can sit on the seat and have access to an operator station 350. Operator station 350 includes a handle bar 360 with left and right operator grips 362 and 364. The handle bar 360 is mounted to the frame 310 so that it can pivot about axis 366. Movement about axis 366 is translated into a steering control signal for steering the machine in one embodiment. The translation is provided via a mechanical linkage, but in other embodiments can be via an electrical signal using any of various different types of electrical sensors to sense the movement of the handle bar. Likewise, hand grip 364 is capable of being rotated about axis 368 relative to the handle bar to control a machine function. In one embodiment, the hand grip 364 (or hand grip 362) can be used to control the position of the lift arm 330.

Although the present invention has been described with reference to preferred embodiments, workers skilled in the art will recognize that changes may be made in form and detail without departing from the spirit and scope of the invention.

What is claimed is:

1. A mini-loader power machine, comprising:
a frame;
first and second tractive elements operably coupled to sides of the frame;
a power source mounted to the frame;
a lift arm operably coupled to the frame;
an operator station positioned at a rear of the frame, the operator station including a seat coupled to the rear of the frame and configured to allow access by an operator from both rearward of the seat and from sides of the seat;
at least one user input device manipulable by an operator to control the lift arm;
first and second foot supports located toward the rear of the frame adjacent the sides of the seat;
a hand grip operator support operably coupled to the frame and configured to be held onto by the operator while seated on the seat and operating the power machine, wherein the hand grip operator support comprises handle bars with grips configured to be held onto by the hands of the operator, wherein the at least one user input device is positioned on the hand grip operator support, and wherein the handle bar is configured to pivot about an axis such that pivotal movement of the handle bar about the axis is translated into a steering control signal for steering the power machine.

2. The mini-loader of claim 1, wherein the seat is configured to be straddled by the operator when seated on the seat such that first and second legs of the operator are each positioned on opposite sides of the seat.

3. The mini-loader of claim 2, and further comprising a suspension configured to attach the seat to the rear of the frame.

4. The mini-loader of claim 1, wherein each of the first and second foot supports further comprise a first foot support portion formed in a first plane oriented at a first angle relative to a support surface over which the mini-loader travels.

5. The mini-loader of claim 4, wherein each of the first and second foot supports further comprise a second foot support portion formed in a second plane different from the first plane.

6. The mini-loader of claim 5, wherein the second foot support portion is positioned forward of the first foot support portion, and wherein a second angle between the second foot support portion and the support surface is greater than the first angle between the first foot support portion and the support surface.

7. The mini-loader of claim 5, wherein the second foot support portion is oriented to support the operator's feet while seated on the seat, and the first foot support portion is oriented to support the operator's feet while standing and straddling the seat.

8. The power machine of claim 1 wherein at least one of the grips of the handle bars are rotatable relative to the handle bars to control a function of the power machine.

9. The power machine of claim 1, wherein the at least one user input device includes a user input controller positioned on the hand grip operator support and configured to be manipulated using a thumb of the operator while the operator's hand holds onto the hand grip operator support.

10. A power machine, comprising:
a frame;
a lift arm operably coupled to the frame and configured to perform a work function;
first and second tractive elements operably coupled to sides of the frame;
a power source mounted to the frame;
an operator station positioned at a rear of the frame, the operator station including:
at least one user input device manipulable by an operator and configured to responsively control the lift arm;
first and second foot supports located toward the rear of the frame adjacent the sides of the seat; and
a handle bar having first and second grips operably coupled to the frame and configured to be held onto by the operator, wherein the at least one user input device is positioned on the handle bar, wherein the handle bar is configured to pivot about an axis such that pivotal movement of the handle bar about the axis is translated into a steering control signal for steering the power machine.

11. The power machine of claim 10 and further comprising a seat operably coupled to a rear of the machine.

12. The power machine of claim 11, and further comprising a suspension configured to couple the seat to the rear of the frame.

13. The power machine of claim 11, wherein each of the first and second foot supports include first and second foot support portions, the first foot support portion formed in a first plane oriented at a first angle relative to a support surface over which the power machine travels.

14. The power machine of claim 13, wherein the second foot support portion is formed in a second plane different from the first plane.

15. The power machine of claim 14, wherein the second foot support portion is positioned forward of the first foot support portion, and wherein a second angle between the second foot support portion and the support surface is greater than the first angle between the first foot support portion and the support surface.

* * * * *